United States Patent [19]
Prevot

[11] Patent Number: 4,989,428
[45] Date of Patent: Feb. 5, 1991

[54] DEVICE FOR ASSEMBLING THE HEADPIECE AND THE CASING OR CASINGS OF A LOCKING DEVICE SUCH AS A LOCK, ESPAGNOLETTE, ESPAGNOLETTE-LOCK OR THE LIKE

[75] Inventor: Gérard Prevot, Willerwald, France

[73] Assignee: Ferco International Usine de Ferrures de Batiment, Sarrebourg, France

[21] Appl. No.: 525,854

[22] Filed: May 21, 1990

[30] Foreign Application Priority Data
May 23, 1989 [FR] France .................................. 89 06893

[51] Int. Cl.$^5$ .............................................. E05B 9/00
[52] U.S. Cl. ........................................ 70/448; 70/450; 70/451
[58] Field of Search ................. 70/448, 450, 451, 449, 70/443

[56] References Cited

U.S. PATENT DOCUMENTS

| | | | |
|---|---|---|---|
| 425,237 | 4/1890 | Morton | 70/450 |
| 2,387,552 | 9/1944 | Schlage | 70/450 |
| 2,454,195 | 11/1948 | Erkkila | 70/448 |

Primary Examiner—Robert L. Wolfe
Attorney, Agent, or Firm—Sandler, Greenblum & Bernstein

[57] ABSTRACT

A locking device such as a lock, espagnolette, espagnolette-lock and the like comprises a headpiece having an inner face onto which is inserted at least one casing comprising two parallel walls. The assembling between the headpiece and the casing or casings is obtained by means of riders in the form of profile lengths with a "U"-shaped cross-section comprised of two parallel wings and a transversal wall made integral with the inner face of said headpiece, both parallel wings of the riders forming means for seizing each of the parallel walls of the casing or casings.

8 Claims, 1 Drawing Sheet

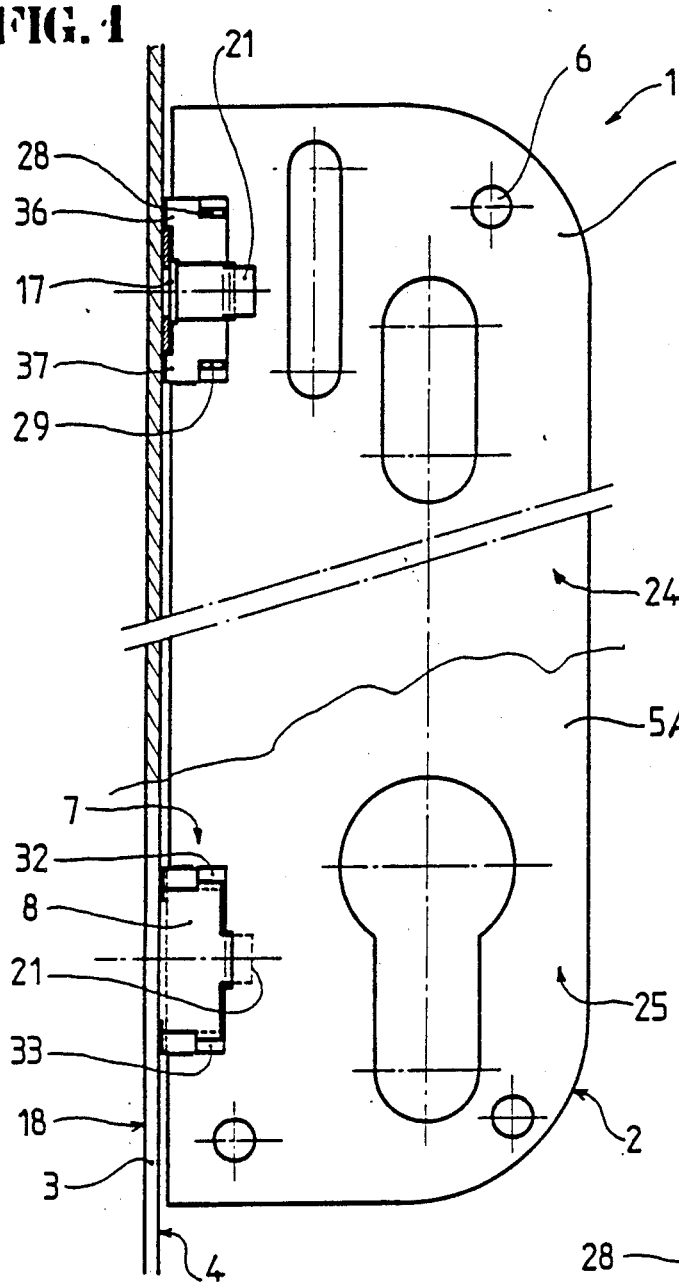

DEVICE FOR ASSEMBLING THE HEADPIECE AND THE CASING OR CASINGS OF A LOCKING DEVICE SUCH AS A LOCK, ESPAGNOLETTE, ESPAGNOLETTE-LOCK OR THE LIKE

The invention relates to a locking device, such as a lock, espagnolette, espagnolette-lock or the like, comprising at least a casing inserted onto the inner face of a headpiece and comprised of two parallel walls enclosing a mechanism for the control of one or several locking elements.

This invention will find application, more particularly, in the field of building ironmongery.

There is already known a number of locking devices meeting the description hereinafter, the features of which depend on the functions they will have to carry out. However, because of their mounting inside the front edge of a door, window or the like, these locking devices, irrespective of their features, have a number of common characteristics. Viz., they generally comprise a headpiece intended to be affixed to said front edge of the leaf allowing, in some way, to make the locking device integral with same. Besides, this headpiece covers a control mechanism inserted into a casing and acting onto the moving of locking devices, such as a half-turn bolt, dead bolt, operating rods or the like. In fact, the casing, provided with its control mechanism, is arranged into a cut made in the front edge of the leaf. Besides, it is comprised of two parallel walls made integral at the level of their front edge, the inner face of the above-mentioned headpiece or, according to a second embodiment, one of the walls is fixed, at the level of its front edge, onto said inner face of the headpiece, whilst the other wall is made integral with the first one by screwing or riveting.

More particularly, the methods nowadays implemented to make the walls of a casing integral with the headpiece of a locking device have a number of disadvantages which this invention proposes to solve, viz., as regards the pre-assembled casings.

Because of the exposure to ambient air, hence to humidity, of these headpieces, it is indeed necessary to apply a corrosion-preventive type coating by immersion into an electrolytic bath. Now, such a surface treatment allows no welding being carried out afterwards, since the quality of the corrosion-preventive protection coating would automatically deteriorate.

Therefore, when the walls of the casing are intended to be welded onto the headpiece, as this usually occurs, it is necessary to carry out this welding prior to proceeding to the surface treatment of said headpiece. This is hardly not possible, nor to be envisaged with pre-assembled casings, since the mechanism should treated and, thus, its operation would be made difficult. In addition, since this casing is built-in in the front edge of the leaf and protected by the headpiece, it is less subject to corrosive agents.

As a result, an assembling by welding of the casing to the headpiece of a locking device requires a useless overconsumption of components of the electrolytic bath and causes an accelerated ageing of the appliances for the implementation of this surface treatment. Without taking into account that, because of the overall size of the headpieces provided with their casings, the number of simultaneously treated parts is necessarily limited. This results obviously into a particularly high cost price of these locking devices.

It should also be noted, by the way, that the welding requires, in most cases, a compatibility of the materials to be assembled. Now, such a requirement can mean a substantial extra cost of the locking device in some special cases, viz., when same is intended to be used in a particularly corrosive ambient. In such circumstances, the headpiece is indeed frequently made of a stainless steel material. Now, because of the constraint set forth hereinabove, the manufacturer is required to make also the normally protected casing of such a stainless steel material.

In order to cope with the aforementioned trouble, there exists another method, also commonly used, for making the casing or casings of a locking device integral with the headpiece. This method in particular consists in carrying out the riveting of said casing onto the headpiece, same having, for this purpose, openings capable of receiving riveting means such as studs, tongues or the like, integral with the front edge of the parallel walls forming the casings.

The advantage of such a method resides in that the riveting can be carried out after having subjected the headpiece to a surface coating without thereby excessively altering same. However, it also has a number of disadvantages residing, viz., in that the riveting means such as studs, tongues or the like, are visible on the outer face of the headpiece and, as a consequence, exposed to corrosion, on the one hand, and conferring the locking device an inaesthetic look, on the other hand.

Besides, from FR-A-2,619,407 there is also known a device for fixing a casing onto a headpiece of a locking device making use of riveting means comprised of studs projecting with respect to the inner face of the headpiece. Onto these riveting means or studs is jointed said casing which, in this case, has a specific configuration. It is indeed necessarily comprised of, on the one hand, a case provided with assembling means capable of co-operating with the riveting means integral with the headpiece and, on the other hand, a cover covering said case and made integral with same by fixing organs such as screws, rivets or the like.

All things considered, because of this specific design of the casing of the locking device and the riveting which is to be carried out at the level of the inner face of the headpiece by means of specific tools, the mounting of the control mechanism of the locking device in the casing can be ensured only after assembling of the case of same onto said headpiece. As a result, this solution cannot be suited for pre-assembled casings.

There is known, furthermore, another device for fixing a casing of a lock, espagnolette, espagnolette-lock or the like, onto a headpiece. In particular, this headpiece may be fitted, at the level of its inner face and by means of a riveting method, with assembling organs intended for co-operating with the walls said casing is comprised of, in order to make same integral with this headpiece.

Various embodiments of these assembling organs have been disclosed in this previous document. Thus, some of them co-operate with said walls of the casing through fixing organs, such as screws or the like, other require only a simple jointing of said casing. In this latter case, said assembling organs are provided with tongues capable of being inserted into openings made in the sidewalls the casing is comprised of and, thus, of impeding the drawing-back of same with respect to the headpiece.

Within the framework of this prior state of technique, it should be noted that the assembling organs, because of their specific design, have a number of disadvantages leading either to an increased mounting time or to an unreliable casing-headpiece assembling. In the case of assembling by screwing, such an assembling indeed requires the machining of a bore followed by a tapping in order to allow the co-operation with the fixing screw.

Besides, screwing is an operation difficult to be carried out by means of automatic mounting devices, in particular because of the presence of a screw which should be perfectly positioned in front of the tapped hole or the nut prior to conferring it a rotary motion about its axis.

As a result, this specific co-operation of the assembling organs, making use of fixing elements such as screws, is not adapted at all to a manufacturing in large series by means of modern tooling making use of automation.

As regards the solution of the jointing or snapping-in of the casing onto the headpiece through assembling organs, this seems not to be suited for fittings intended to withstand important stresses and, viz., espagnolettes or espagnolettes-locks.

The object of this invention is to cope with all the above-mentioned troubles by providing, viz. a locking device the casing or casings of which are capable of being pre-assembled, hence to contain the control mechanisms, even before proceeding to their mounting onto the inner face of a headpiece which may, therefore, be individually treated against corrosion. It should be noted that this mounting can be automatized and is obtained through assembling means, on the one hand, not visible at the level of the outer face of this headpiece and, on the other hand, capable of firmly seizing each of the parallel walls of the casing or casings without it being necessary to carry out a riveting.

For this purpose, the invention relates to a locking device such as a lock, espagnolette, espagnolette-lock and the like, comprising a headpiece having an inner face onto which is inserted at least a casing comprising two parallel walls, the assembling between the headpiece and the casing or casings being obtained by means of riders in the form of profile lengths with a "U"-shaped cross-section comprised of two parallel wings and a transversal wall made integral with the inner face of said headpiece, both parallel wings of the riders forming means for seizing each of the parallel walls of the casing or casings.

Other objects and advantages of this invention will become apparent during the description which will follow. Same is accompanied by drawings showing only one embodiment.

BRIEF DESCRIPTION OF THE DRAWINGS

FIG. 1 is a schematic and partly cross-sectional bird's eye view of a headpiece provided with a casing, corresponding to the locking device according to the invention, FIG. 2 is a detail view of one of the walls the casing as shown in FIG. 1 is comprised of, FIG. 3 is a cross-sectional view according to line 111—111 of FIG. 2, FIG. 4 is a schematic and front view of the means capable of seizing the parallel walls of a casing containing the control mechanism of a locking device, FIG. 5 is a left-hand view of FIG. 4, FIG. 6 is a top view of FIG. 4.

This invention relates to a locking device 1, such as a lock, espagnolette, espagnolette-lock or the like, intended to be built-in in the front edge of a door, window or the like. Therefore, this locking device 1 comprises at least one casing 2 serving as a housing for a control mechanism (not shown) capable of acting onto one or several locking elements, such as a half-turn bolt, dead bolt, operating rods or the like. Of course, the number of casings 2 a locking device 1 comprises depends, more particularly, on the characteristics of same. In all cases, the casing or casings 2 are made integral with a headpiece 3, more exactly, the inner face 4 of same, intended to apply against the front edge of the leaf.

It should be specified that the casing or casings 2 are mainly comprised of two parallel walls 5, 5A made integral with one another by means of spacers 6 and defining an inner space reserved for the above-mentioned control mechanism.

In fact, and according to the invention, the assembling of the casing or casings 2 onto the headpiece 3 is ensured by means of means 7 capable of seizing said parallel walls 5, 5A, these means 7 being initially inserted by riveting onto the inner face 4 of said headpiece 3.

According to a preferred embodiment of this invention, shown in the various Figures, the means 7 are comprised of riders 8 distributed over the inner face 4 of the headpiece 3, in the area of the casing or casings 2. In fact, these riders 8 are formed of profile lengths with a "U"-shaped cross-section comprising two parallel wings 10, 11 made integral, at the level of their end 12, 13, with a transversal wall 14.

This latter is, more particularly, intended to be applied against the inner face 4 of the headpiece 3 in order to be riveted to same. For this purpose, said transversal wall 14 comprises openings 15, 16 serving as passage for riveting means 17 such as studs or tongues integral with the inner face 4 of the headpiece 3. In this respect, it should be specified that said riveting means 17 and, viz., the studs or tongues can be obtained by a simple material upset, from the outer face 18 of said headpiece 3 when shaping and deep drawing same.

As to the parallel wings 10, 11 of these riders 8, their main function is to seize the parallel walls 5, 5A of the casing or casings 2. For this purpose, said side wings 10, 11 comprise, at the level of their free end 19, 20, at least a tongue 21. This latter is located, set planes and this in direction of the longitudinal median plane 22 of the profile length 9 formed by the riders 8. In fact, the distance 23 between the tongues 21 corresponding to the parallel wings 10, 11 is so defined that said tongues 21 be capable of being inserted into the casing 2, between the parallel walls 5, 5A, and of co-operating with the inner face 24 of same, whilst the parallel wings 10, 11 themselves, of the riders 8, are intended, more particularly, to co-operate with the outer face 25 of these parallel walls 5, 5A of the casing or casings 2. However, in order to avoid a wider cut in the front edge of a leaf, because of an extra thickness the direct affixing of the parallel wings 10, 11 of the riders 8 onto the outer face 25 of the parallel walls 5, 5A could cause, same are deep drawn in the area of these riders 8. This allows to define recesses 26, at the level of the outer face 25 of these parallel walls 5, 5A capable of receiving said parallel wings 10, 11. In these recesses 26 are made, besides, cuts 39 allowing the passage of the tongues 21 of the wings 10, 11 and, finally, allowing said tongues 21 to have access to the level of the inner face 24 of the parallel walls 5, 5A. Thus, the wings 10, 11 are capable of being flush with the outer face 25 of the parallel walls 5, 5A of the casing or casings 2, same maintaining, in these circumstances, a standard thickness. All things considered, the distance 27 between the parallel wings 10, 11 of a rider 8 is substantially equal to the distance kept by the parallel walls 5, 5A of the casing or casings 2 of the locking device 1.

The means 7 formed by the riders 8 and capable of seizing the parallel walls 5, 5A of said casing or casings 2 are completed, in addition, with mechanically distortable feet 28, 29 made integral with the side edges 30, 31 of the parallel wings 10, 11. In fact, these feet 28, 29 are intended to be pushed back into openings 32, 33 made in these parallel walls 5, 5A of the casing or casings 2. More particularly, after jointing of same onto their respective riders 8, so that, on the one hand, the tongues 21 co-operate with the inner face 24 of the parallel walls 5, 5A and, on the other hand, the parallel wings 10, 11 be located in the recesses 26 made in their outer face 25, the openings 32, 33 will be located in front of the feet 28, 29 which should then be folded in the direction of the casing 2.

In order to make easier the mounting of the casing or casings 2 onto the headpiece 3 and to guarantee their perfect positioning with respect to same, the transversal wall 14 of the riders 8 comprises, besides, recesses 34, 35 capable of receiving the positioning tongues 36, 37 integral with the front edge 38 oriented in the direction of the headpiece 3 of the parallel walls 5, 5A.

All things considered, during the mounting of the casing or casings 2 of a locking device onto a headpiece 3, one initially proceeds to the riveting of the riders 8 onto the inner face 4 of same, then, after surface treatment, said casings 2 are inserted into their respective riders 8, before carrying out their final assembling by proceeding to the pushing back of the feet 28, 29 into the corresponding openings 32, 33.

Such method of assembling, making use of means 7 according to the invention and capable of seizing the parallel walls 5, 5A of the casing or casings 2, finally allows to individually treat the headpieces 3 against corrosion, then to affix, at the level of their inner face 4, one or several pre-assembled casings 2 without riveting marks being visible on the outer face 18 of these headpieces 3. This invention thus provides a solution for all the troubles experienced so far in the framework of the assembling of the casing or casings 2 of a locking device onto their headpiece.

I claim:

1. Locking device such as a lock, espagnolette, espagnolette-lock and the like, comprising a headpiece (3) having an inner face (4) onto which is inserted at least one casing (2) comprising two parallel walls (5, 5A), the assembling between the headpiece and the casing or casings (2) being obtained by means of riders (8) in the form of profile lengths (9) with a "U"-shaped cross-section comprised of two parallel wings (10, 11) and a transversal wall (14) made integral with the inner face (4) of said headpiece (3), both parallel wings (10, 11) of the riders (8) forming means for seizing each of the parallel walls (5, 5A) of the casing or casings (2).

2. Locking device according to claim 1, comprising at least one casing (2) comprising two parallel walls (5, 5A) each having an outer face (25) and an inner face (24), the parallel wings (10, 11) of the riders (8) being inserted into recesses (26) made in front of same in the outer face (25) of the parallel walls (5, 5A) of the casing (2), so as to be flush with said outer face (25) of these parallel walls (5, 5A).

3. Locking device according to claim 1, comprising at least one casing (2) comprising two parallel walls (5, 5A) having an outer face and an inner face, the parallel wings (10, 11) of the riders (8) having a free end at the level of which is located at least a tongue (21) which co-operates with the inner face (24) of the parallel walls (5, 5A) of the casing (2).

4. Locking device according to claim 1, the parallel wings (10, 11) of the riders (8) of which have side edges (30, 31) at the level of which are provided feet (28, 29) which are located, after jointing of the casing (2) onto said riders (8), in front of openings (32, 33) made in the parallel walls (5, 5A), in order to be mechanically pushed back into same.

5. Locking device according to claim 3, the riders (8) of which have parallel wings (10, 11) located on both sides of a longitudinal median plane (22), these parallel wings (10, 11) comprising a free end at the level of which is located at least a tongue (21), same being located, with respect to the wings (10, 11), in planes substantially offset in direction of said longitudinal median plane (22).

6. Locking device according to claim 5, comprising at least one casing (2) comprising two parallel walls (5, 5A) defining an inner space, the tongues (21) located at the free ends of the parallel wings (10, 11) of the riders (8) keeping between them a distance (23) corresponding to the inner space defined by said parallel walls (5, 5A) of the casings (2).

7. Locking device according to claim 2, comprising at least one casing (2) inserted onto the inner face (4) of a headpiece (3) by means of riders (8) comprising two parallel wings (10, 11) which engage into recesses (26) made in front of same in the outer face (25) of the parallel walls (5, 5A) of the casings (2), said parallel wings (10, 11) being provided with one free end at the level of which is located a tongue (21) which co-operates with the inner face (24) of said parallel walls (5, 5A), same having, in front of the recesses (26), a cut (39) serving as passage for said tongue (21).

8. Locking device according to claim 1, comprising at least one casing (2) comprising two parallel walls (5, 5A) having a front edge (38) provided with positioning tongues (36, 37), the transversal wall (14) of the riders (8) comprising recesses (34, 35) serving as passage for said positioning tongues (36, 37).

* * * * *